US012709977B2

(12) United States Patent
Dunham et al.

(10) Patent No.: US 12,709,977 B2
(45) Date of Patent: Aug. 18, 2026

(54) METHOD TO DETERMINE FRICTIONAL PRESSURE LOSSES FROM FLUID FLOW THROUGH WELLS, PIPES, AND PERFORATIONS FROM ANALYSIS OF WATER HAMMER

(71) Applicant: Seismos, Inc., Austin, TX (US)

(72) Inventors: Eric M. Dunham, Stanford, CA (US); Junwei Zhang, Austin, TX (US); Daniel Moos, Palo Alto, CA (US)

(73) Assignee: Seismos, Inc.

( * ) Notice: Subject to any disclaimer, the term of this patent is extended or adjusted under 35 U.S.C. 154(b) by 884 days.

(21) Appl. No.: 18/156,047

(22) Filed: Jan. 18, 2023

(65) Prior Publication Data

US 2023/0228185 A1 Jul. 20, 2023

Related U.S. Application Data

(60) Provisional application No. 63/300,576, filed on Jan. 18, 2022.

(51) Int. Cl.
*E21B 47/06* (2012.01)
*E21B 43/26* (2006.01)
*G01N 11/04* (2006.01)

(52) U.S. Cl.
CPC .............. *E21B 47/06* (2013.01); *E21B 43/26* (2013.01); *G01N 11/04* (2013.01)

(58) Field of Classification Search
CPC ........ E21B 47/06; E21B 43/26; E21B 49/008; E21B 41/00; E21B 47/00; G01N 11/04
See application file for complete search history.

(56) References Cited

FOREIGN PATENT DOCUMENTS

WO WO-2019217480 A1 * 11/2019 ............ E21B 43/00

OTHER PUBLICATIONS

Chen, N. H. (1979). An explicit equation for friction factor in pipe. Industrial & Engineering Chemistry Fundamentals, 18 (3), 296-297.
Cramer, D. D. (1987). The application of limited-entry techniques in massive hydraulic fracturing treatments. Presented at the SPE Production Operations Symposium, Oklahoma City, Oklahoma, Mar. 8-10. SPE-16189-MS.
Crump, J. B., & Conway, M. W. (1988). Effects of perforation-entry friction on bottomhole treating analysis. Journal of Petroleum Technology, 40(08), 1041-1048.

(Continued)

*Primary Examiner* — Timothy P Graves
(74) *Attorney, Agent, or Firm* — Richard A. Fagin

(57) ABSTRACT

A method for determining flowing fluid pressure loss in a well includes moving fluid through a well pipe and perforations in a well pipe at a first rate. A pressure of the fluid moving at the first rate is measured. The rate of moving fluid is changed to a second rate. The rate is changed so as to induce tube waves in the well. Pressure of the fluid moving at the second rate is measured. The measured pressures are used to determine frictional fluid pressure loss in the well pipe and frictional and fluid pressure loss through the perforations. The measured pressures and determined frictional fluid pressure losses are used to determine a fluid pressure outside the perforations.

18 Claims, 11 Drawing Sheets

(56) References Cited

OTHER PUBLICATIONS

Dunham, E. M., Harris, J. M., Zhang, J., Quan, Y., & Mace, K. (2017). Hydraulic fracture conductivity inferred from tube wave reflections. SEG International Exposition and Annual Meeting. SEG-2017-17664595.
Weijers, L., Wright, C. A., Sugiyama, H., Sato, K., & Zhigang, L. (2000). Simultaneous propagation of multiple hydraulic fractures—Evidence, impact and modeling implications. International Oil and Gas Conference and Exhibition in China.
Lorwongngam, A., Wright, S., Hari, S., Butler, E., McKimmy, M., Wolters, J., & Cipolla, C. (2020). Using Multidisciplinary Data Gathering to Evaluate eXtreme Limited Entry Completion Design and Improve Perforation Cluster Efficiency. In Unconventional Resources Technology Conference, Jul. 20-22, 2020 (pp. 341-369). Unconventional Resources Technology Conference (URTEC).
Mondal, S., Zhang, M., Huckabee, P., Ugueto, G., Jones, R., Vitthal, S., Nasse, D., & Sharma, M. (2021). Advancements in step down tests to guide perforation cluster design and limited entry pressure intensities—Learnings from field tests in multiple basins. SPE Hydraulic Fracturing Technology Conference and Exhibition. SPE-204147-MS.
Moody, L. F. (1944). Friction factors for pipe flow. Trans. ASME, 66, 671-684.
Paillet, F. L., & White, J. E. (1982). Acoustic modes of propagation in the borehole and their relationship to rock properties. Geophysics, 47(8), 1215-1228.
Ugueto C, G. A., Huckabee, P. T., Molenaar, M. M., Wyker, B., & Somanchi, K. (2016). Perforation cluster efficiency of cemented plug and perf limited entry completions; Insights from fiber optics diagnostics. SPE Hydraulic Fracturing Technology Conference. SPE-179124-MS.

* cited by examiner

METHOD TO DETERMINE FRICTIONAL PRESSURE LOSSES FROM FLUID FLOW THROUGH WELLS, PIPES, AND PERFORATIONS FROM ANALYSIS OF WATER HAMMER

CROSS REFERENCE TO RELATED APPLICATIONS

Priority is claimed from U.S. Provisional Application No. 63/300,576 filed on Jan. 18, 2022, which application is incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of pumping fluid into subsurface wells for treatment of the well and reservoir formation(s) hydraulically connected to the well. More specifically, the disclosure relates to methods for determining amounts of fluid pressure loss during pumping such treatments in order to characterize the effect of pumping such treatments on the well and on the reservoir formation(s).

Fluid pumping treatments for subsurface wells may be used for, among other things, improving productivity of reservoir formation(s) that are hydraulically connected to the well. Such treatments include, for example, hydraulic fracturing, wherein liquid (e.g., water with certain additives) having suspended particles (proppant) is pumped into the formation(s) through the well such that the formations are ruptured (fractured) and the particles may be deposited in the induced fractures to hold (prop) them open after pumping pressure is relieved.

Good treatment design and practice includes having an understanding of the pressure and the rate at which fluid is pumped into the formation(s). The pumping rate may be measured at the surface or elsewhere using well known devices that measure operating rate of pump(s) used to move the fluid and/or various forms of mass and/or volumetric flow meters. Pressure may be readily measured proximate the surface in the well using any form of pressure sensor. Measuring pressure at the axial position (depth) of the formation(s) inside the well may be performed using in-well pressure sensors, for example, conveyed by electrical cable, slickline or coiled or jointed tubing.

AS the fluid is pumped through the well along a pipe disposed in the well, and through openings (perforations) made in the pipe adjacent to the reservoir formation(s), fluid pressure is lost as a result of friction loss by reason of the pipe and perforations. Determining well pipe and perforation friction (and consequent pressure loss) are an integral part of hydraulic fracture diagnostics. Existing methods to determine contributions to friction based on analysis of wellhead pressure, for example in step rate tests (see, e.g., Cramer et al., 2019; Mondal et al., 2021), suffer from non-uniqueness. This non-uniqueness can be reduced by the use of in-well (downhole) pressure gauges, distributed acoustic sensing (DAS) fiber optic technology, and/or downhole video-based perforation imaging, but these are costly to deploy (see, e.g., Ugueto et al., 2016; Cramer et al., 2019). Pressure measurement sensors disposed deep in the well complicate the treatment operation and disposal therein may require considerable time. Furthermore, as fluid is pumped into the formation(s) through the perforations in the well pipe (e.g., casing, tubing or liner, which is used to seal and protect the formations from exposure and mechanical failure), pumping energy is lost by reason of fluid friction. While it is possible to include pressure sensors externally to the well, such sensors ordinarily would need to be deployed as the well construction is completed, e.g., on the exterior of the well pipe, and remain in place. Such deployment would add to the cost and complexity of well construction.

Methods for estimating pipe friction known in the art only determine the sum of pipe friction and perforation friction uniquely from standard step rate analyses (see, e.g., Cramer et al., 2019; Mondal et al., 2021).

What is needed is a method for determining fluid pressure as it leaves the well and enters the formation based on more economically deployed sensors, such as wellhead pressure sensors.

SUMMARY

One aspect of the present disclosure is a method for determining flowing fluid pressure loss in a well. A method according to this aspect of the present disclosure includes moving fluid through a well pipe and perforations in the well pipe at a first rate. A pressure of the fluid moving at the first rate is measured. The rate of moving fluid is changed to a second rate. The rate is changed so as to induce tube waves in the well. Pressure of the fluid moving at the second rate is measured. The measured pressures are used to determine frictional fluid pressure loss in the well pipe and frictional and fluid pressure loss through the perforations. The measured pressures and determined frictional fluid pressure losses are used to determine a fluid pressure outside the perforations.

A computer program according to another aspect of the present disclosure is stored in a non-transitory computer readable medium. The program has logic operable to cause a programmable computer to perform acts, comprising, accepting as input to the computer measurements of a pressure in a well of fluid moving at a first rate through the well. After changing the rate of moving fluid to a second rate, wherein the rate is changed so as to induce tube waves in the well, accepting as input to the computer measurements of pressure of the fluid flowing at the second rate. The measured pressures at the first rate and at the second rate are used to determine frictional fluid pressure loss in a well pipe, and frictional fluid pressure loss through perforations in the well pipe. The measured pressures and determined frictional fluid pressure losses are used to determine a fluid pressure outside the perforations.

In some embodiments of the method and the computer program, the changing rate comprises decreasing the flow rate.

In some embodiments of the method and the computer program, the determining fluid pressure loss in the pipe comprises determining a pipe friction factor based on pressure change with respect to time after the changing flow rate and prior to a reflected tube wave reaching a position of the measuring pressure.

In some embodiments of the method and the computer program, the determining pipe friction factor comprises initializing a value of the friction factor, modeling the pressure change with respect to time based on the pipe friction factor, comparing the modeled pressure change to the measured pressure change, and adjusting the pipe friction factor and repeating the modeling until a difference between the modeled pressure change and the measured pressure change falls below a selected threshold.

In some embodiments of the method and the computer program, the determining frictional fluid pressure loss in the perforations comprises determining a friction coefficient (factor) of the perforations.

In some embodiments of the method and the computer program, the determining the friction coefficient of the perforations comprises initializing a value of the friction coefficient of the perforations, modeling a pressure with respect to time of a reflected tube wave in the well, comparing the measured pressure to the modeled reflected tube wave pressure, adjusting the friction coefficient of the perforations and repeating modeling the reflected tube wave pressure until a difference between the modeled tube wave pressure and a change in measured pressure from the reflected tube wave falls below a selected threshold.

In some embodiments of the method and the computer program, the flowing fluid at the first rate and at the second rate comprises pumping an hydraulic fracture treatment.

In some embodiments of the method and the computer program, the fluid pressure outside of the perforations comprises fluid pressure at a mouth of a fracture in a reservoir formation.

Other aspects and possible advantages will be apparent from the description and claims that follow.

DETAILED DESCRIPTION

Figure 1:
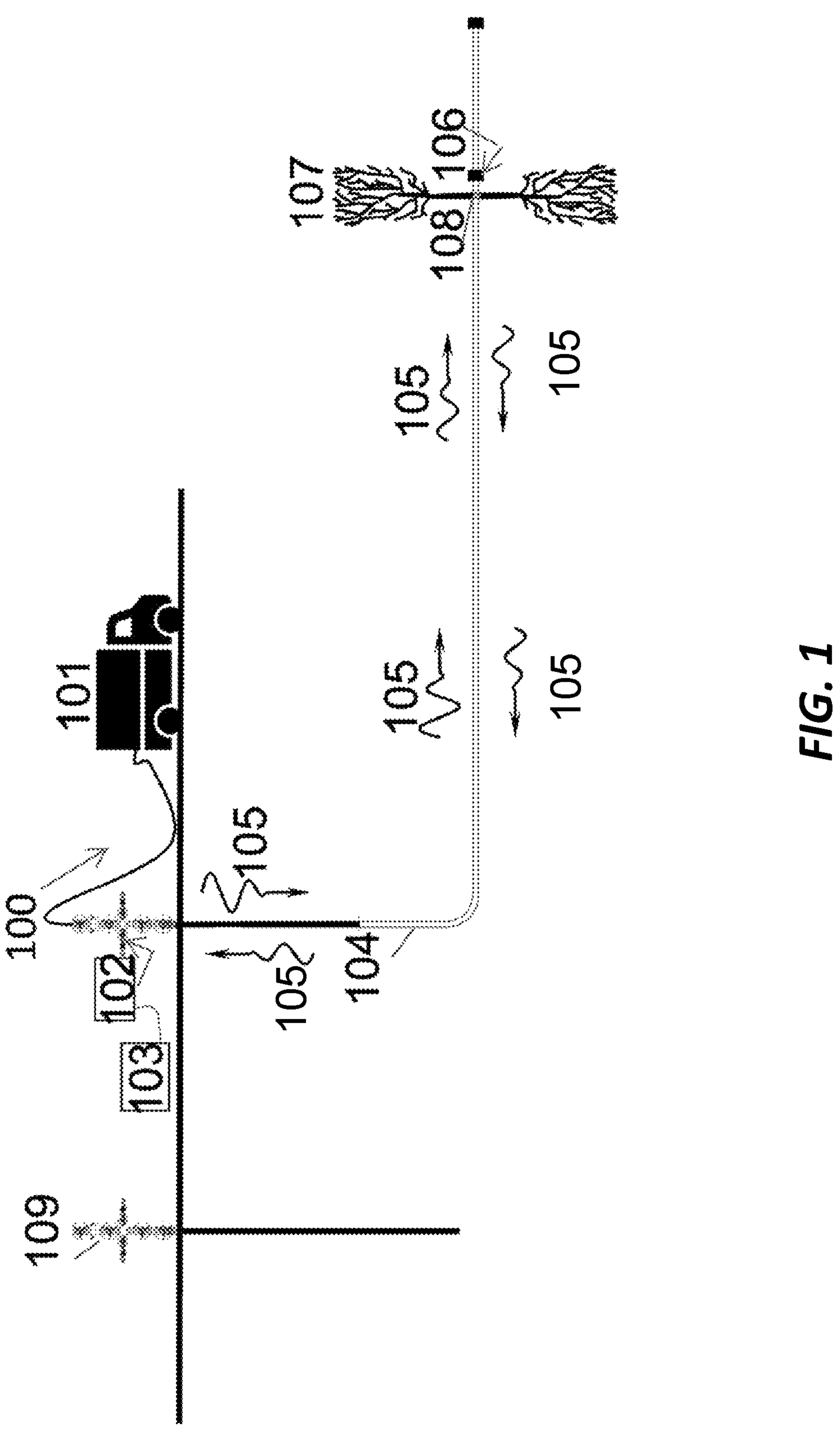
FIG. 1 shows an example embodiment of a data acquisition system that may be used in some embodiments.

A method according to the present disclosure enables quantification of pipe fluid friction and perforation fluid friction pressure losses when pumping fluid through a well, thereby enabling determining pressure at the mouth of hydraulic fractures in adjacent reservoir formation(s) using measurements of pressure made at or proximate to the surface end of the well, e.g., the wellhead.

There are many applications for a method according to the present disclosure. Knowledge of downhole pressure can be used to calibrate models of hydraulic fracture growth where such models are used to constrain hydraulic fracture geometry in hydraulic fracture diagnostics (see, e.g., Weijers et al., 2000). The disclosed method can also be used to separately determine pipe friction and perforation friction.

In addition, the determined perforation friction value can be compared to a prediction based on an established formula expressing perforation friction in terms of the number of perforations, their diameter, the fluid density, and the volumetric flow rate through the perforations (see, Crump & Conway, 1988). If the determined perforation friction exceeds the predicted value, it may indicate that some of the perforations were not created or do not provide fluid connection to an active hydraulic fracture. This can be quantified in terms of the perforation cluster efficiency (see, e.g., Cramer et al., 2019; Mondal et al., 2021). If the determined perforation friction is smaller than the predicted value, it suggests that perforation erosion and/or other effects have decreased the ability of the perforation design to control fluid distribution between and/or among the fractures. Because of perforation erosion, the perforation efficiency computed from the measured value is an upper bound on the actual perforation efficiency.

Moreover, the ability to measure perforation friction allows a well operator to vary certain treatment parameters, such as varying acid volume in the initial treatment design, varying proppant scours downhole to help mitigate perforation friction, and eventually pumping some more viscous fluid to help generate more dominant fractures. This could translate in the value of 'changing' design for better erosion and cluster efficiency. Determined friction values may be coupled with industry knowledge of erosion give additional actionable recommendations in terms of proppant volume and/or intensity with reference to perforation changes.

The results from the disclosed method can inform, especially at the end of a treatment stage, behavior of friction reducers, identify causes of a pressure rise or pressure loss (e.g., a single perforation cluster screen out), and to evaluate or adjust limited entry fracturing design parameters such as cluster perforation number, perforation diameter, type, depth, spacing, or orientation, etc.

In addition to the hydraulic fracturing applications listed above, the disclosed method can be used in any application involving pumping of fluids in pipe.

Having explained certain uses for a method according to the present disclosure, an example embodiment of such a method will now be explained. FIG. 1 is a schematic diagram of an example well data acquisition system ("system") that may be used in some embodiments. The system 100 comprises components associated with a well including fluid pump(s) 101, such as hydraulic fracturing fluid pumps or other fluid treatment pumps; sensors such as hydrophones or pressure transducers 102 in fluid pressure communication with the well; a data acquisition and processing apparatus 103 (described in more detail below); a well pipe 104, e.g., a casing or liner disposed in a well drilled through a reservoir formation; a plug or wellbore bottom 106; fracture network 107 in hydraulic communication with the well through perforations 108 made in the well pipe (e.g., casing or liner) 104. A nearby well 109 may be present in the area of interest. One or more water hammer pulses 105 may be generated by the pumps 101, such as by a step change in the rate of pumping, or a pressure pulse may be generated by other means such as a fluid pressure pulse generator. The pulse(s) travel along the well in the form of tube waves. The sensors 102 may be nonintrusive devices such as pressure transducers, accelerometers, and hydrophone(s), any or all of which may be disposed in a location on or near the top of the well (e.g., the wellhead) to measure pressure, pressure time derivative and/or particle motion of fluid in the well continuously before, during, and after pumping of a treatment such as an hydraulic fracture treatment. Characteristics of such data may be analyzed as explained below to obtain parameters such as frictional pressure loss along the well and through the perforations also as will be explained in more detail below.

To better understand methods according to the present disclosure, an explanation of flowing fluid pressure loss in a well follows. Consider a well that is in fluid communication with hydraulic fractures in a subsurface formation through perforations in the well casing or liner, such as the example well explained with reference to FIG. 1. Fluid pumped into the well, such as for hydraulic fracturing treatment, flows through the well pipe, and through the perforations into the surrounding formation. As a result the pumped fluid experiences a pressure loss due to friction. Quantifying this pressure loss is important in order to relate fluid pressure at the mouth of the fracture(s), denoted $p_f$, to the fluid pressure at the wellhead, $p_{wh}$. Fluid pressure at the mouth of the fracture(s) $p_f$ is the pressure at the exterior of the perforations, and is therefore a result of fluid pressure at the wellhead, less pressure losses in the well and through the perforations, plus hydrostatic pressure of the fluid column in the well. Pressure at the wellhead is directly measurable with easily deployable sensors such as shown in FIG. 1, and the wellhead is where the fluid is typically introduced into the well during pumping of treatments. Measuring pressure at the mouth of the fractures, by contrast, would require sensors to be placed outside the casing or liner during well construction and as a result may be impractical.

During steady-rate fluid flow, e.g., during pumping a treatment, a relationship among the various well fluid pressures may be characterized by the following expression (see, Cramer, 1987; Economides et al., 2001):

$$p_f = p_{wh} + p_{hyd} + p_{pipe} + p_{perf} \tag{1}$$

where $p_{hyd}$ is the hydrostatic pressure of the fluid in the well at the depth of the fracture, $p_{pipe}$ is the pressure loss from pipe friction in the casing or liner, and $p_{perf}$ is the pressure loss from perforation friction.

Pipe friction occurs throughout the well and may be quantified in terms of the pressure loss per unit distance along the well:

$$\left(\frac{\partial p}{\partial x}\right)_{pipe} = \frac{4\tau}{D} \tag{2}$$

where τ is the casing or liner wall shear stress and D is the diameter of the casing or liner. The wall shear stress depends on the volumetric flow rate, Q, through the well according to the expression (see, Moody, 1944):

$$\tau = \frac{f}{8}\rho v^2,\ Q = Av,\ A = \pi D^2/4 \tag{3}$$

where f is the Darcy-Weisbach friction factor, ρ is fluid density, v is cross-sectionally averaged particle velocity, and A is the cross-sectional area of the casing or liner. At high Reynolds number, the flow within the well is turbulent, the friction factor f is approximately constant (see, Moody, 1944; Chen, 1979), such that the pressure loss is proportional to the square of the flow rate $Q^2$. The total pressure loss from pipe friction may be obtained by integration over the axial dimension (length) L of the well; assuming spatially uniform pressure loss per unit distance and using the expressions above yields the following expression for pipe pressure loss:

$$p_{pipe} = \frac{8f\rho Q^2}{\pi^2 D^5}L \tag{4}$$

Perforation friction describes the pressure loss from turbulent flow through perforations in the casing or liner. Letting q denote the volumetric flow rate through a set of perforations into a surrounding formation, the pressure loss from perforation friction may be provided by the expression:

$$p_{perf} = k'_{perf}q^2, \tag{5}$$

where the perforation friction coefficient $k'_{perf}$ depends on fluid density ρ, the diameter of each perforation hole, and the number of perforation holes $N_p$ (see, Crump & Conway, 1988; Cramer et al., 2019):

$$k'_{perf} = 0.808\frac{\rho}{C^2N_p^2d^4} \tag{6}$$

The dimensionless constant C in Eq. (6) is referred to as the discharge coefficient and is typically between 0.6 and 0.9. It is known in the art (see, Lorwongngam et al., 2020) that C can change during fracturing due to perforation erosion. Often there are multiple "clusters" of perforations in a well, that is, groups of perforations spaced closely (on the order of 2 to 12 perforations per foot of casing or liner length), the groups being separated from other such groups by tens of feet or more. Let $N_c$ be the number of clusters, such that $N_c \times N_p$ is the total number of perforations. Then, assuming the flow rate Q is distributed evenly among all clusters, $q=Q/N_c$. Inserting this into Eq. (5) provides an alternative expression for the pressure loss from perforation friction:

$$P_{perf} = k_{perf}Q^2, \tag{7}$$

$$P_{perf} = k_{perf}Q^2, \text{ where the perfect friction coefficient is} \tag{8}$$

$$k_{perf} = \frac{k'_{perf}}{N_c^2} = 0.808\frac{\rho}{C^2(N_cN_p)^2d^4}.$$

As the above expressions show, the frictional pressure losses from pipe and perforation friction are both proportional to the square of the fluid flow rate. This makes it difficult or impossible to uniquely determine the relative contributions of these two frictions under steady flow rate conditions, as occur during standard diagnostic procedures such as step rate tests (see, Mondal et al., 2021). Thus, standard methods to determine pipe and perforation friction often assume a value for the Darcy-Weisbach friction factor, leading to large uncertainties in the computed perforation friction. Perforation friction, as explained previously, is a key parameter to be considered by modifications in completion design. Eliminating uncertainty requires measuring pressure downhole at the perforations which is costly and difficult and increases the risk of operational problems.

This disclosure presents a method to determine the pipe friction factor f and the perforation friction coefficient $k_{perf}$ using water hammer. Water hammer propagates as tube waves in a well. Water hammer is generated by rapid changes in flow rate or pressure at the wellhead or elsewhere in the well (see, Paillet & White, 1982; Wylie et al., 1993). Such a method assumes that there is initially steady flow within the well and out through the perforations from fluid injection into a well at the wellhead at rate $Q_0$. The injection rate is then rapidly changed, e.g., decreased by some amount and then held constant at the changed rate. The flow rate change, if rapid enough, generates water hammer oscillations, which appear in wellhead pressure measurements such as the data shown in FIG. 2.

Water hammer can be modeled using computer simulations that solve the equations governing tube wave propagation (see, Wylie et al., 1993):

$$\frac{\rho}{A}\frac{\partial Q}{\partial t}+\frac{\partial p}{\partial x}=-\frac{4\tau}{D}, \tag{9}$$

$$\frac{A}{\rho c^2}\frac{\partial p}{\partial t}+\frac{\partial Q}{\partial x}=0, \tag{10}$$

where x is measured depth along the well, t is time, Q(x,t) is volumetric flow rate, and p(x,t) is the fluid pressure minus hydrostatic pressure. Initial conditions on Q(x,0) and p(x,0) as well as two boundary conditions, one at x=0 and a second at x=L (defined below as the bottom of the well), are also required. The initial conditions correspond to steady flow at the injection rate:

$$Q(x,0)=Q_0, \tag{11}$$

$$p(x,0)=p_0-\frac{8f\rho Q_0^2}{\pi^2 D^5}x, \tag{12}$$

where $p_0$ is the pressure at the wellhead prior to shut-in. At the wellhead, injection rate is specified as a boundary condition. At time t=0, the injection rate is rapidly changed (decreased) by an amount ΔQ, such that $$Q(0,t)=Q_0-\Delta QH(t), \tag{13}$$

where H(t) is the unit step function. It is also possible that the change (decrease) in flow rate occurs over a short, but finite time, in which case H(t) would correspond to a smoothed-out version of the unit step function.

The well connects to fracture(s) through one or more perforation clusters. When the wavelengths of tube waves are large compared to the spacing between perforation clusters, the pressure within the well at the entry to each cluster is approximately the same. This allows the collective response of all clusters to be combined into a composite object that is placed at x=L. It is assumed that the well is hydraulically sealed beyond this, for example by a plug or packer. The location x=L is referred to as the bottom of the well throughout this discussion. Assuming identical clusters, each connecting to one fracture, mass and momentum conservation lead to the following boundary condition at x=L:

$$p(L,t)=p_{perf}(q)+p_f(t)-p_{hyd},\ q=\frac{Q(L,t)}{N_c}. \tag{14}$$

As defined earlier, $N_c$ is the number of perforation clusters (and associated formation fractures), $p_f$ is the pressure at the mouth of the fracture, $p_{hyd}$ is hydrostatic pressure, and $p_{perf}(q)=k'_{perf}q^2$ is the pressure loss from perforation friction.

Any appropriate model for the fracture response can be used to determine $p_f$ When flow rate into a fracture is decreased, following a period of fracture growth, the fracture pressure decays in response to leak-off of fluids, additional fracture extension, and equilibration of pressure within the fracture. The pressure decay can be captured approximately with an evolution equation of the form:

$$\frac{dp_f}{dt}=-\frac{p_f-p_{eq}}{T_{eq}}, \tag{15}$$

which describes the decay of $p_f$ toward an equilibrium pressure, $p_{eq}$, over equilibration time scale $T_{eq}$. In the method described below, $p_f$ can be treated as a constant if the decay is negligible, or it can be modeled by the equation above or a more sophisticated description of fracture pressure evolution, which may also depend on the flow rate into each fracture, q.

Figure 2:
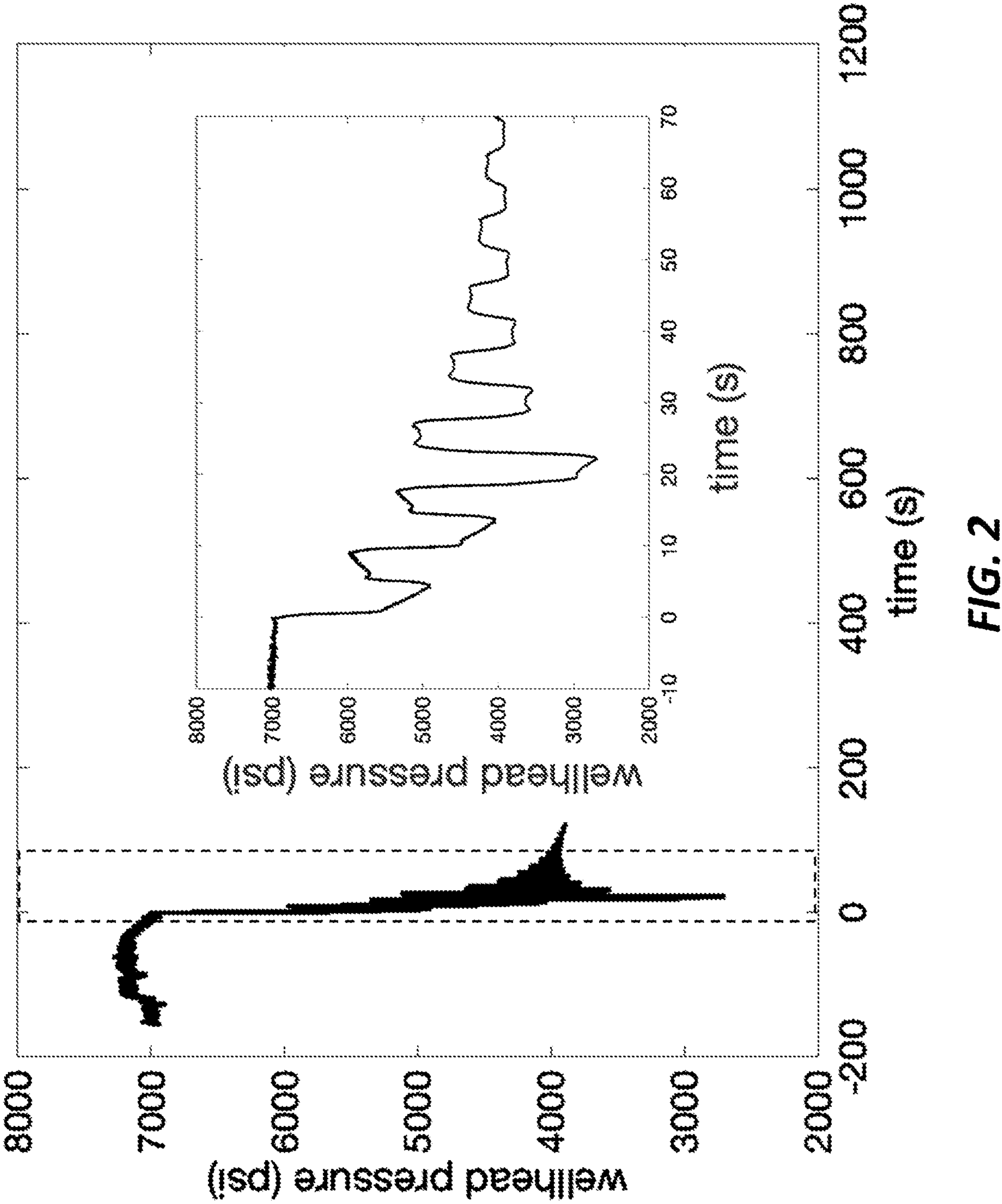
FIG. 2 shows a graph of pressure measurements made in a well proximate a wellhead after a change in fluid flow rate so as to induce water hammer.
Figure 3:
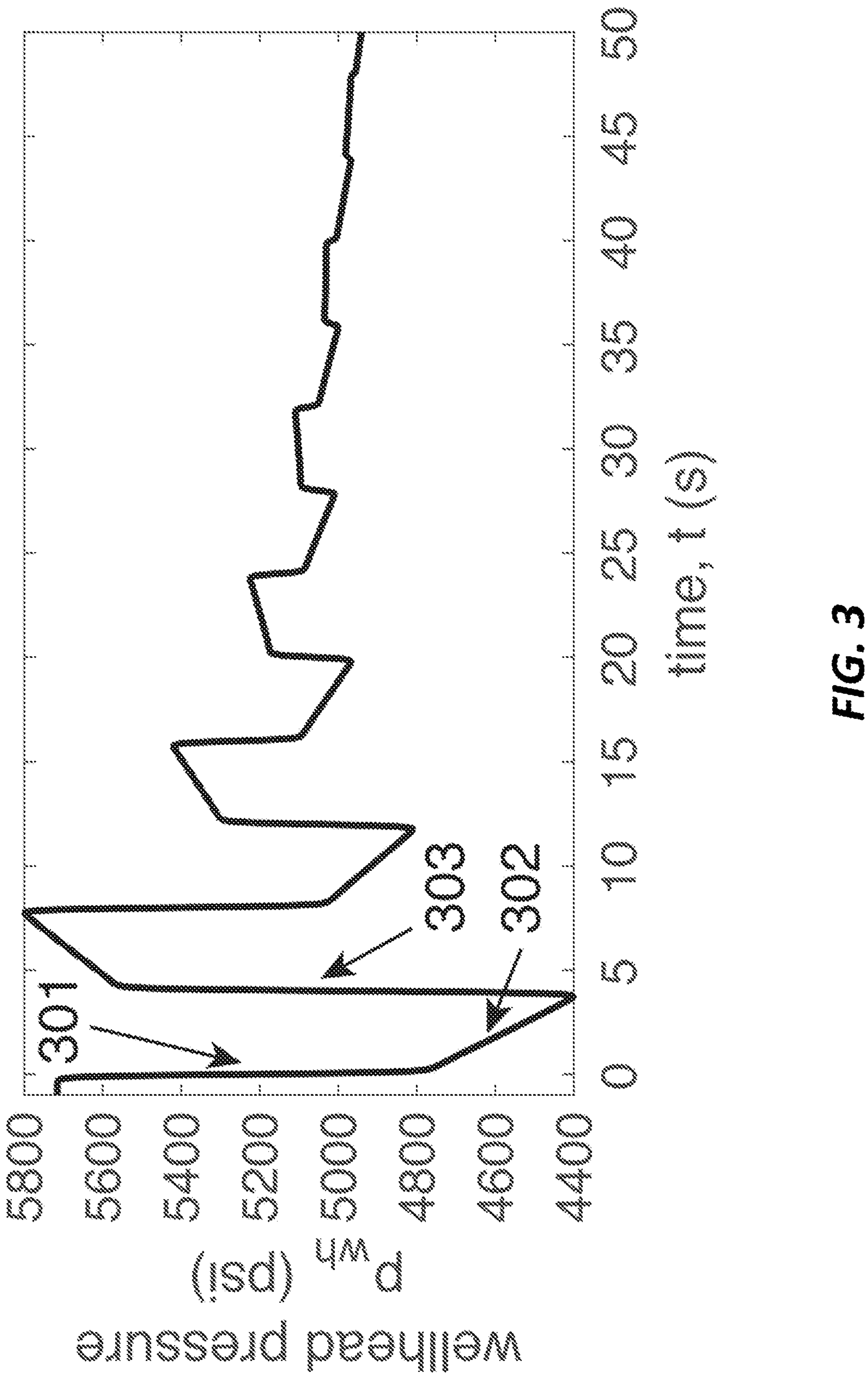
FIG. 3 shows a graph of the result of an example of a computer simulation of wellhead pressure response, obtained by solving the water hammer equations.
Figure 4:
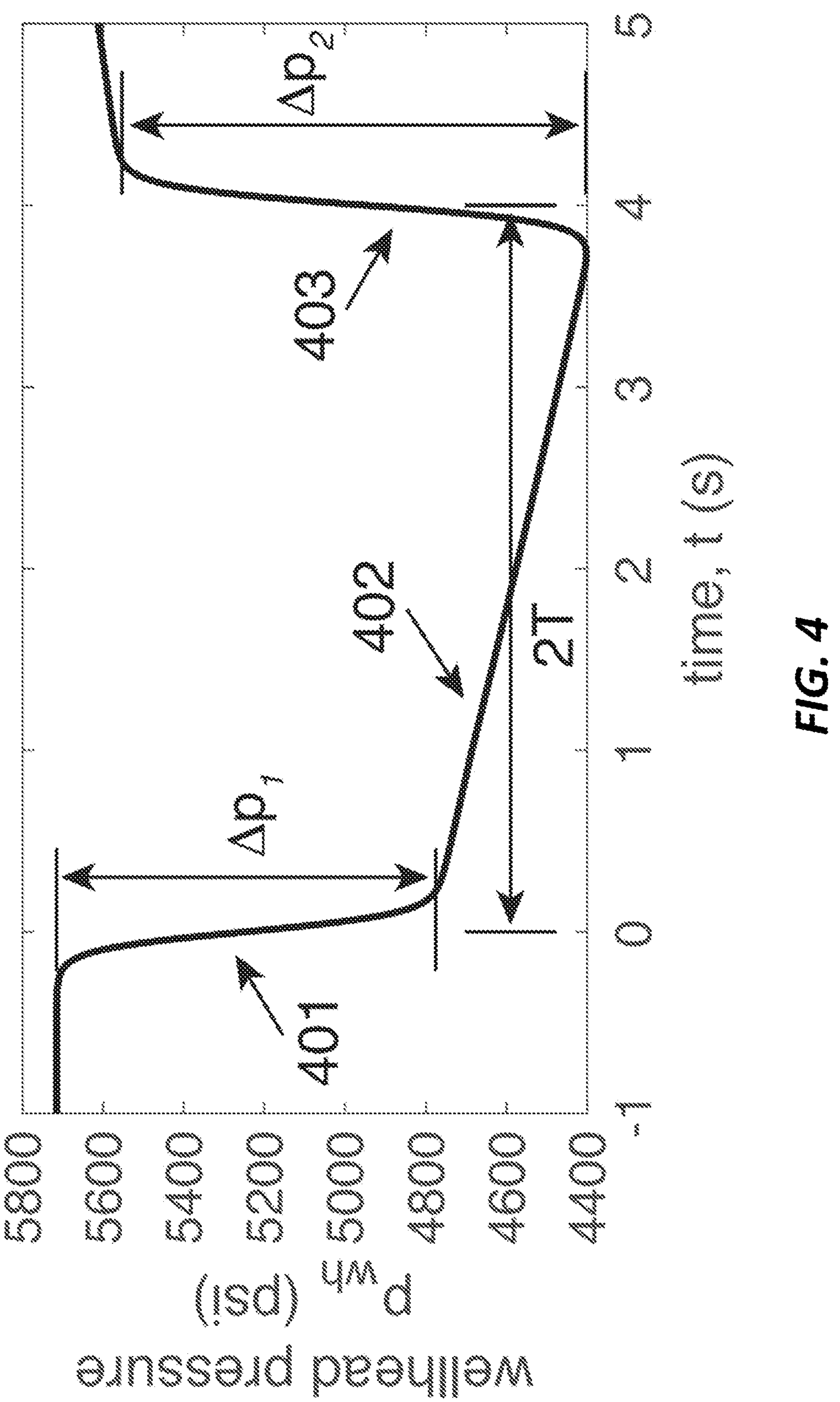
FIG. 4 shows a graph of a pressure within a well with respect to time after changing fluid flow rate.

FIG. 3 shows an example of a computer simulation of wellhead pressure response, obtained by solving the water hammer equations, thereby illustrating that the simulation can reproduce the main features observed in the data. Parameter values in this simulation were not chosen or adjusted to match the data in FIG. 2, so an exact agreement is not expected. Parameter values are fluid density ρ=62.4 lb/ft$^3$, tube wave speed c=5000 ft/s, well length L=10,000 ft, friction factor f=2×10$^{-3}$, perforation friction coefficient $k_{perf}$=0.0064 psi/(bbl/min)$^2$, initial injection rate $Q_0$=80 bbl/min, and drop in injection rate ΔQ=20 bbl/min, and number of clusters $N_c$=4. The drop in injection rate is smoothed out over approximately 0.4 s. FIG. 3 and FIG. 4, which is a zoomed-in version of FIG. 3, show three features of water hammer that will be utilized in this method: 301 and 401 are the pressure drop at the wellhead that occurs immediately when the injection rate is decreased, 302 and 402 are an additional depressurization at the wellhead that appears as downward sloping ramping in wellhead pressure, and 303 and 403 are the first tube wave reflection from the bottom of the well.

The scientific basis of the method explaining these water hammer features follows. The decrease in injection rate by ΔQ causes an immediate decrease in pressure at the wellhead, $\Delta p_1$, associated with the generation of a tube wave that propagates down the well. The pressure change is proportional to the change in injection rate (see, Paillet & White, 1982; Wylie et al., 1993):

$$\Delta p_1=Z_T\Delta Q, \tag{16}$$

where the proportionality constant is the tube wave hydraulic impedance, $$Z_T = \frac{\rho c}{A}. \tag{17}$$

The above relationship between pressure change and rate change holds only during rapid rate changes, prior to the tube wave propagating too far from the wellhead that it experiences significant attenuation from pipe friction.

Figure 5:
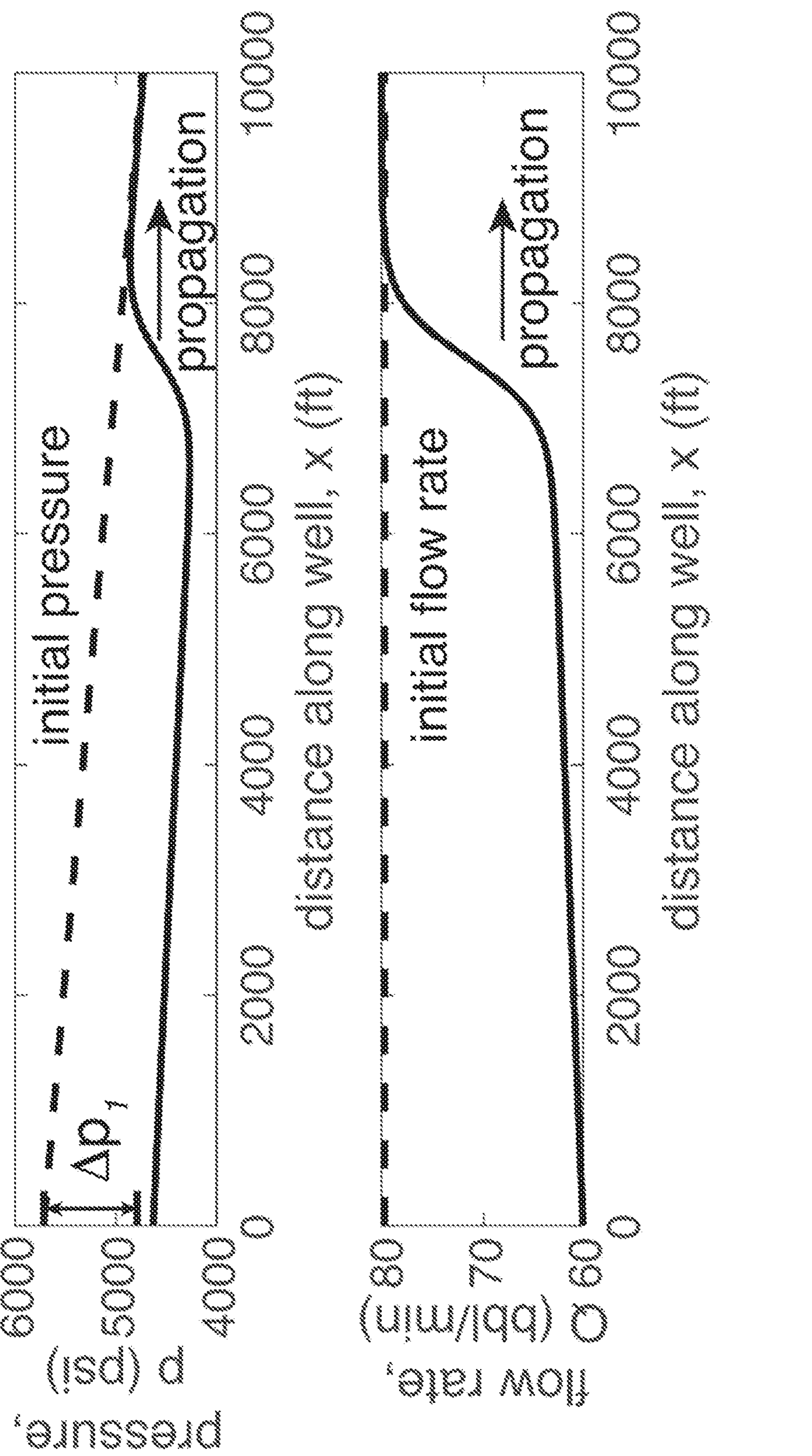
FIG. 5 shows a graph of a pressure profile with respect to depth within the well at time t=2.5 seconds, prior to the tube wave reaching the bottom of the well.

In the absence of pipe friction or other energy loss mechanisms, a tube wave propagates without attenuation down the well, creating a step drop in pressure equal to $\Delta p_1$ and causing the fluid to decelerate from to $Q_0-\Delta Q$ at all points within the well as the tube wave passes. However, attenuation from pipe friction causes the pressure drop carried by the tube wave to decrease. Because this pressure drop is smaller than $\Delta p_1$, the flow rate is not fully decreased to $Q_0-\Delta Q$. The resulting pressure and flow rate profiles within the well at time t=2.5 s, prior to the tube wave reaching the bottom of the well, are shown in FIG. 5. The direction of tube wave propagation is marked with the arrows labeled "propagation."

Figure 6:
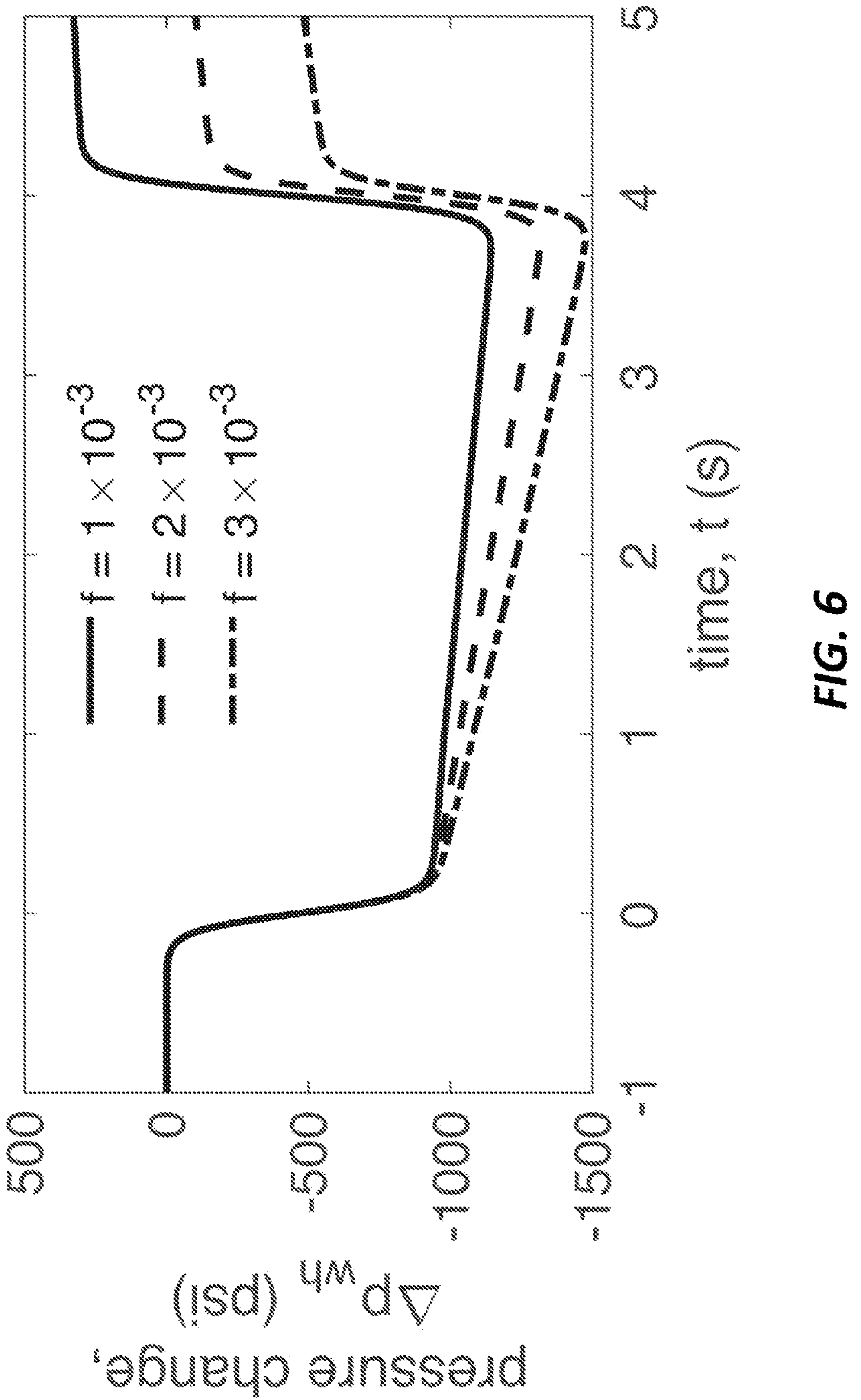
FIG. 6 shows a graph of influence of pipe friction factor on tube wave response.

The pressure decrease at the wellhead is now larger than $\Delta p_1$. The additional depressurization is a consequence of the flow rate behind the tube wave varying along the well. For example, the flow rate is 61 bbl/min at x=2000 ft whereas flow rate at the wellhead x=0 is $Q_0-\Delta Q$=60 bbl/min. Because the flow rate increases with distance from the wellhead, fluid in this region must expand to satisfy conservation of fluid mass. The expansion of the fluid is accompanied by a decrease in pressure. This depressurization, which can ultimately be attributed to pipe friction following the logic explained above, is the ramp-like feature labeled 302 in FIGS. 3 and 402 in FIG. 4. It follows that different values of pipe friction factor f will lead to different slopes of this depressurization ramp. The limiting case of no friction (f=0) will have zero slope, and the slope will increase (down) as f increases. FIG. 6 shows simulations for three values of f, illustrating how the slope changes with f.

To quantify perforation friction, it is necessary to use information contained within tube waves that are reflected from the bottom of the well. The first reflection is shown at 303 in FIGS. 3 and 403 in FIG. 4. The reflection of small-amplitude tube waves from the bottom of the well and associated perforations and fractures is determined by the reflection coefficient (see, Paillet & White, 1982; Wylie et al., 1993; Dunham et al., 2017).

$$R = \frac{Z - Z_T}{Z + Z_T}, \tag{18}$$

where $Z_T$ is the tube wave hydraulic impedance defined earlier and Z is the hydraulic impedance of the composite object (perforations, fractures, plug) that acts as a reflector at the bottom of the well. The perforations and fractures are connected in series, so their hydraulic impedances are added to get the total hydraulic impedance. At sufficiently high background flow rate, the perforation impedance is greater than the fracture impedance. To simplify the discussion to follow, the fracture impedance is assumed to be negligible in comparison to the perforation impedance. The plug is assumed to be rigid and perfectly sealing, so it does not contribute to the impedance of the composite reflector. As before, assume that there are $N_c$ identical clusters of perforations, all clusters experience the same pressure within the well and with the total flow rate divided uniformly across them. This means the clusters are connected in parallel, such that the hydraulic impedance of the composite reflector is $Z=Z_c/N_c$, where $Z_c$ is the hydraulic impedance of one cluster (see, Dunham et al., 2017). When the tube waves induce a sufficiently small variation in flow rate q through one cluster of perforations, the hydraulic impedance of that perforation cluster can be obtained by linearizing the perforation friction expression to quantify the ratio of pressure change to flow rate change:

$$Z_c = \frac{dp_{perf}}{dq} = 2k'_{perf}q. \tag{19}$$

Because $q=Q(L,t)/N_c$, it follows that $$R = \frac{2k'_{perf}Q/N_c^2 - Z_T}{2k'_{perf}Q/N_c^2 + Z_T} = \frac{2k_{perf}Q - Z_T}{2k_{perf}Q + Z_T}. \tag{20}$$

Figure 7:
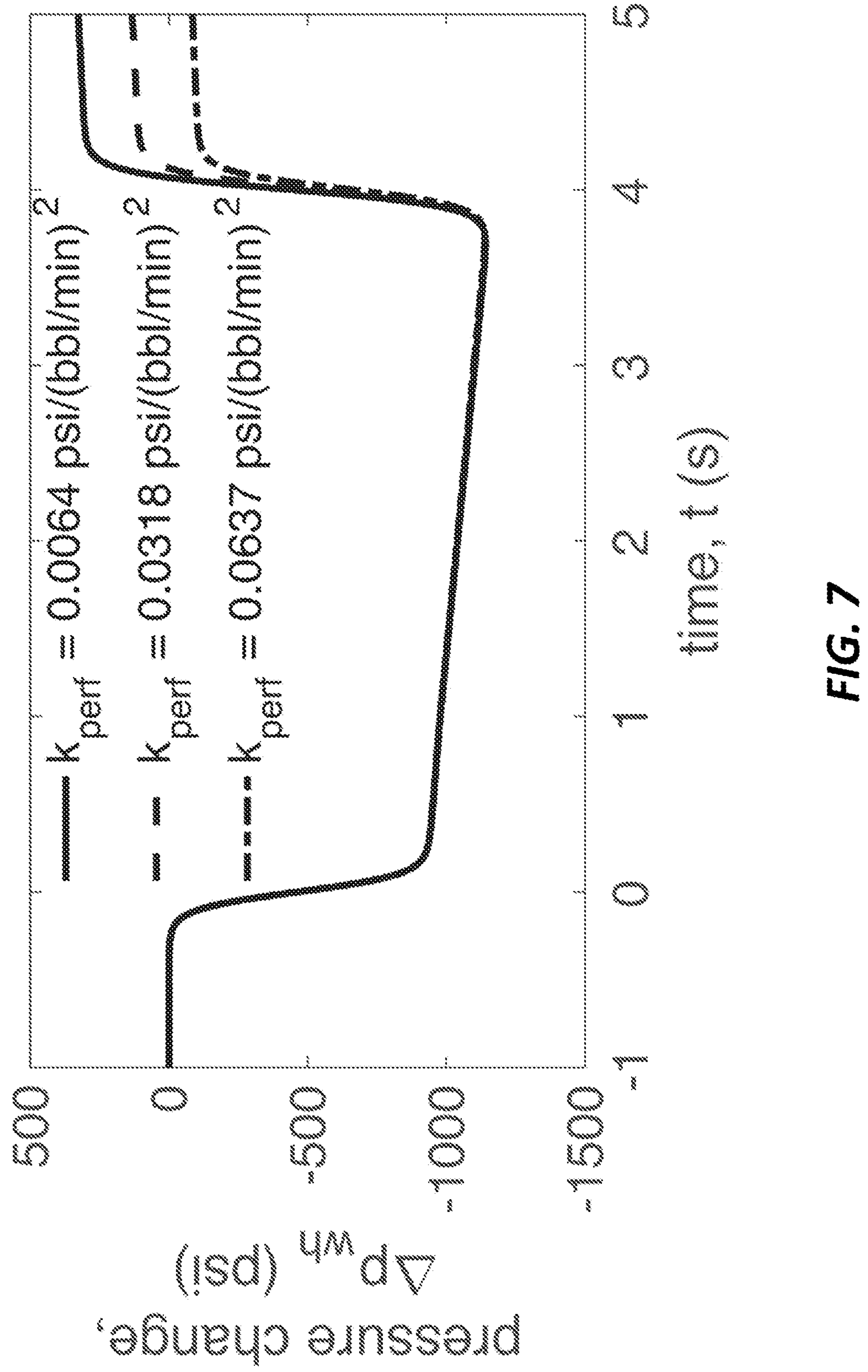
FIG. 7 shows a graph of influence of perforation friction coefficient on tube wave response.

For small amplitude tube waves, the flow rate Q in the expression above can be evaluated at the initial flow rate $Q_0$. For tube waves whose amplitude is too large to justify the use of a linearized theory of wave reflection, computer simulations can be performed to predict the wellhead pressure response. In either case, the reflected wave amplitude is influenced by the perforation friction coefficient $k_{perf}$. FIG. 7 shows simulations for three values of $k_{perf}$, illustrating how the amplitude of the reflected wave changes with $k_{perf}$.

Figure 8:
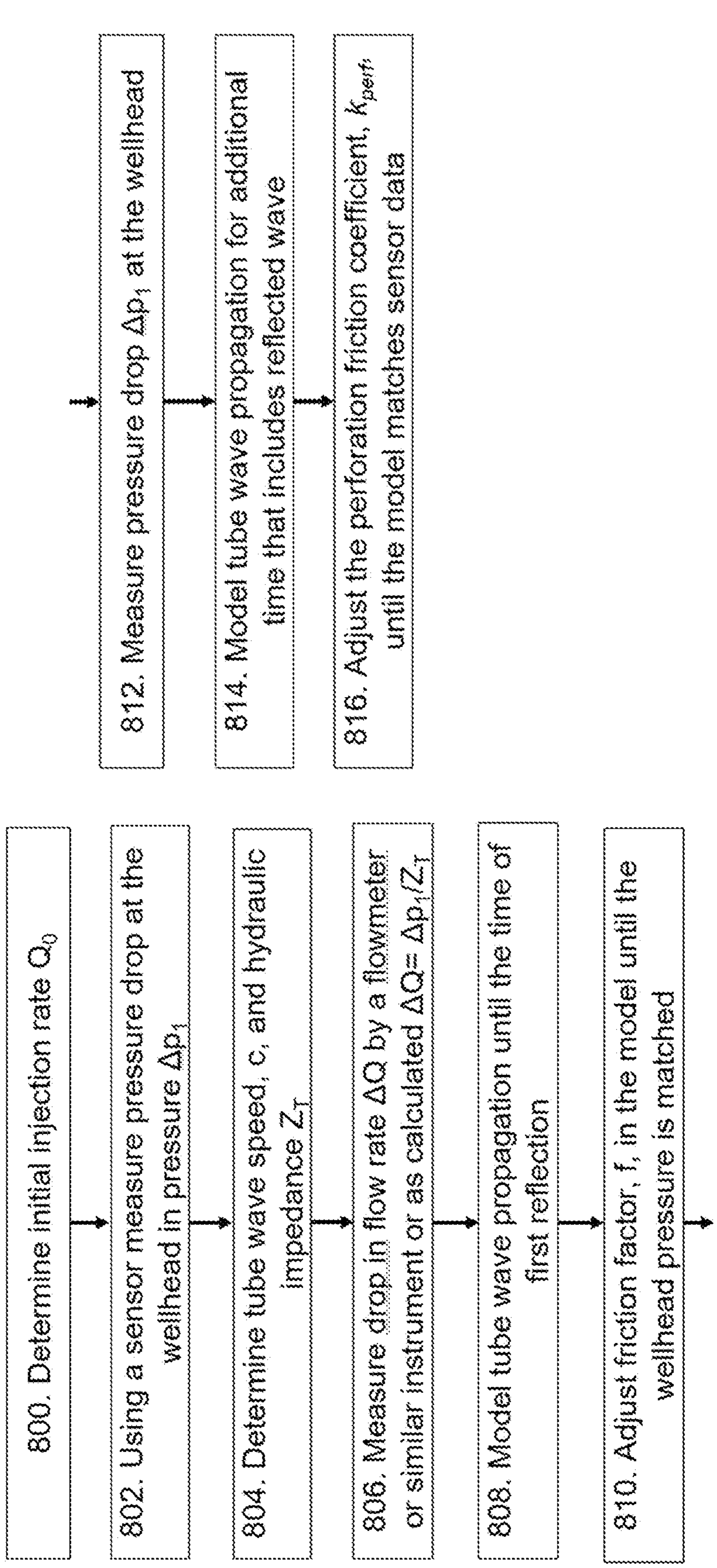
FIG. 8 shows a flow chart of an example embodiment of a method according to the present disclosure.

An example embodiment of a method according to the present disclosure for determining well pressure loss and for determining perforation friction loss may be better understood with reference to the flow chart in FIG. 8.

The initial fluid flow (e.g., injection) rate $Q_0$ may be established or determined, at 800, by measurement (e.g., using a flow meter or similar instrument) or by calculation (e.g., from the pump operating rate). A pressure in the well proximate the wellhead may be measured.

At 802, the flow rate is changed by a selected amount. In some embodiments, the flow rate is reduced by the amount $\Delta Q$. The pressure drop $\Delta p_1$ that occurs immediately during the drop in injection rate (shown at 301 in FIGS. 3 and 401 in FIG. 4) is measured at 802, for example using the wellhead pressure sensor used to measure the initial flow rate pressure at 800.

The tube wave speed c and tube wave hydraulic impedance $Z_T$ are determined at 804. Such determination can be made from independent constraints or by measuring the two-way travel time 2T (as shown in FIG. 3) for tube waves propagating from the wellhead to the bottom of the well, and back to the wellhead. The two way travel time 2T may be determined from the measurements of pressure made using the same sensor used to measure pressure at 800 and 802. The tube wave speed is then given by c=L/T using the known distance L from the wellhead to the bottom of the well. The tube wave hydraulic impedance can then be calculated using the formula in Eq. (17), provided that fluid density and well cross-sectional area are known. The fluid density can be calculated from the equation of state of the fluid.

The change (drop) in flow rate $\Delta Q$ is either measured, at 806, using a flow meter or similar instrument, or may be calculated as $\Delta Q=\Delta p_1/ZT$.

At 808, tube wave propagation is modeled from the time of the flow rate change, until the time of the first tube wave reflection from the bottom of the well, using the time-dependent fluid flow rate that has been determined at 800 to 804. The model will produce as an output a simulated pressure/time response as shown in the graph in FIG. 3. The modeled pressure/time response may be compared to the measured pressure/time response.

At 810, the friction factor f is adjusted, and the wellhead pressure response is once again modeled using the changed value of f. The resulting modeled pressure/time response is again compared to the measured pressure/time response. The foregoing may be repeated until the compared simulated response matches the measured wellhead pressure/time response during the time period labeled 302 in FIGS. 3 and 402 in FIG. 4, or differences fall below a predetermined threshold or error limit. The change in pressure (i.e., depressurization for a flow rate decrease) that occurs during this time period is caused by pipe friction.

The present example embodiment of a method is based on the change (drop) in fluid flow rate happening over a time scale shorter than 2T The method to determine pipe friction requires no assumptions about the perforations and fracture properties, nor is it sensitive to their properties, because it uses pressure data obtained prior to the reflected tube wave arrival.

To determine perforation friction pressure loss, the following may be implemented. The pressure drop $\Delta p_2$ that occurs when the reflected tube wave arrives at the wellhead (shown at 303 in FIGS. 3 and 403 in FIG. 4) is measured at 812, for example using a wellhead pressure sensor as shown in FIG. 1, which may be the same sensor as used to measure pressure at 800 and 802. Tube wave propagation is modeled at 814 for period of time that includes the reflected tube wave, wherein the modeling begins with an initial value of perforation friction coefficient $k_{perf}$. The modeled pressure response is compared to the measured pressure response. At 816, the perforation friction coefficient $k_{perf}$ is adjusted and the pressure response is modeled once again. The foregoing is repeated until the modeled pressure response matches the measured pressure response of $\Delta p_2$, or differences fall below a predetermined threshold or error limit.

Figure 9:
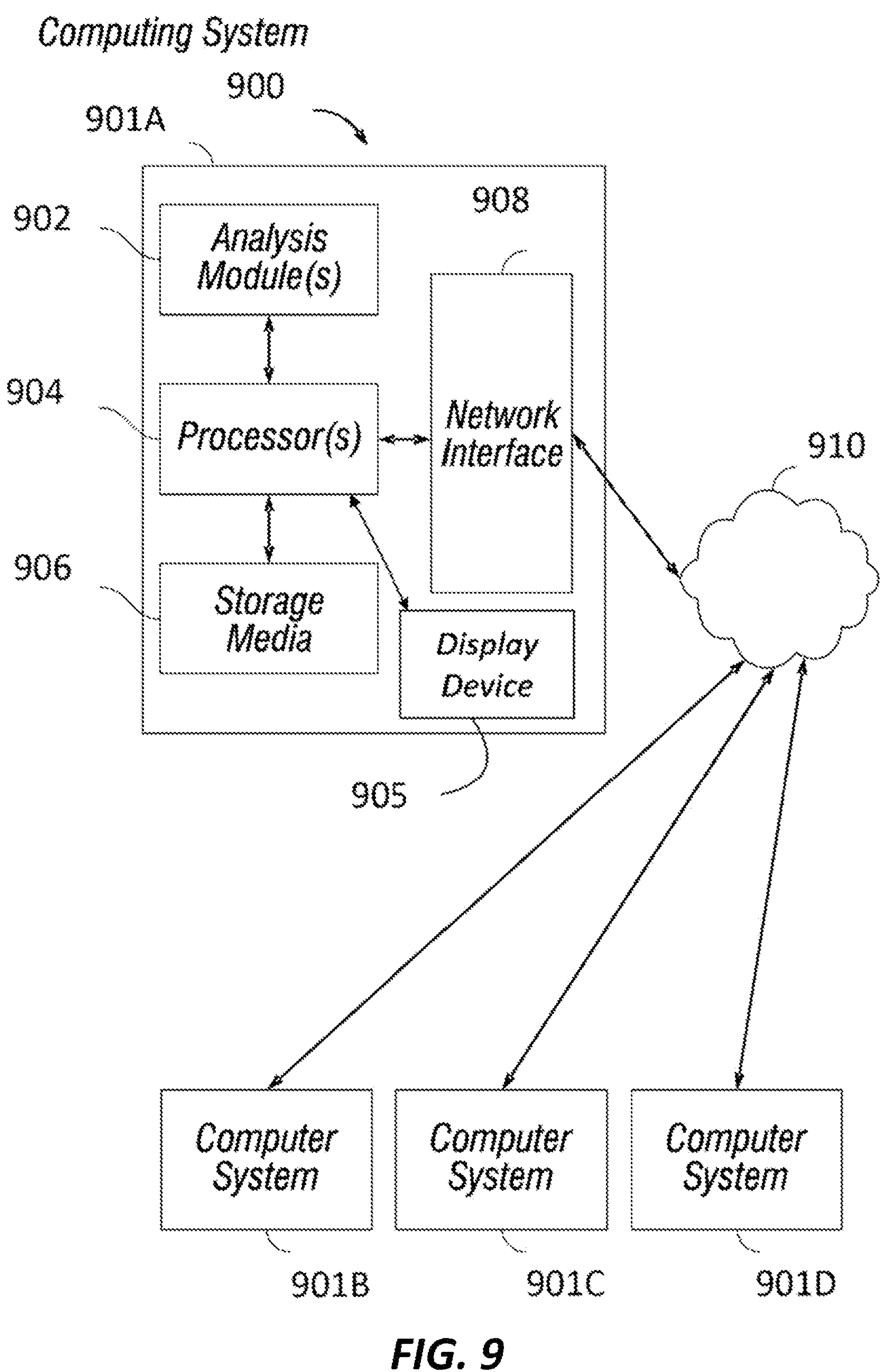
FIG. 9 shows a computer system that may be used in some embodiments.

FIG. 9 shows an example computing system 900 in accordance with some embodiments that may be used to implement a method according to the present disclosure. The computing system 900 may be an individual computer system 901A or an arrangement of distributed computer systems. The individual computer system 901A may include one or more analysis modules 902 that may be configured to perform various tasks according to some embodiments, such as the tasks explained with reference to FIG. 9. To perform these various tasks, the analysis module 902 may operate independently or in coordination with one or more processors 904, which may be connected to one or more storage media 906. A display device 905 such as a graphic user interface of any known type may be in signal communication with the processor 904 to enable user entry of commands and/or data and to display results of execution of a set of instructions according to the present disclosure.

The processor(s) 904 may also be connected to a network interface 908 to allow the individual computer system 901A to communicate over a data network 910 with one or more additional individual computer systems and/or computing systems, such as 901B, 901C, and/or 901D. Note that computer systems 901B, 901C and/or 901D may or may not share the same architecture as computer system 901A, and may be located in different physical locations, for example, computer systems 901A and 901B may be at a well drilling location, while in communication with one or more computer systems such as 901C and/or 901D that may be located in one or more data centers on shore, aboard ships, and/or located in varying countries on different continents.

A processor may include, without limitation, a microprocessor, microcontroller, processor module or subsystem, programmable integrated circuit, programmable gate array, or another control or computing device.

The storage media 906 may be implemented as one or more computer-readable or machine-readable storage media. Note that while in the example embodiment of FIG. 9 the storage media 906 are shown as being disposed within the individual computer system 901A, in some embodiments, the storage media 906 may be distributed within and/or across multiple internal and/or external enclosures of the individual computing system 901A and/or additional computing systems, e.g., 901B, 901C, 901D. Storage media 906 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 900 is only one example of a computing system, and that any other embodiment of a computing system may have more or fewer components than shown, may combine additional components not shown in the example embodiment of FIG. 9, and/or the computing system 900 may have a different configuration or arrangement of the components shown in FIG. 9. The various components shown in FIG. 9 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Application of the Method to Field Data and Calculation of Perforation Cluster Efficiency.

Figure 10A:
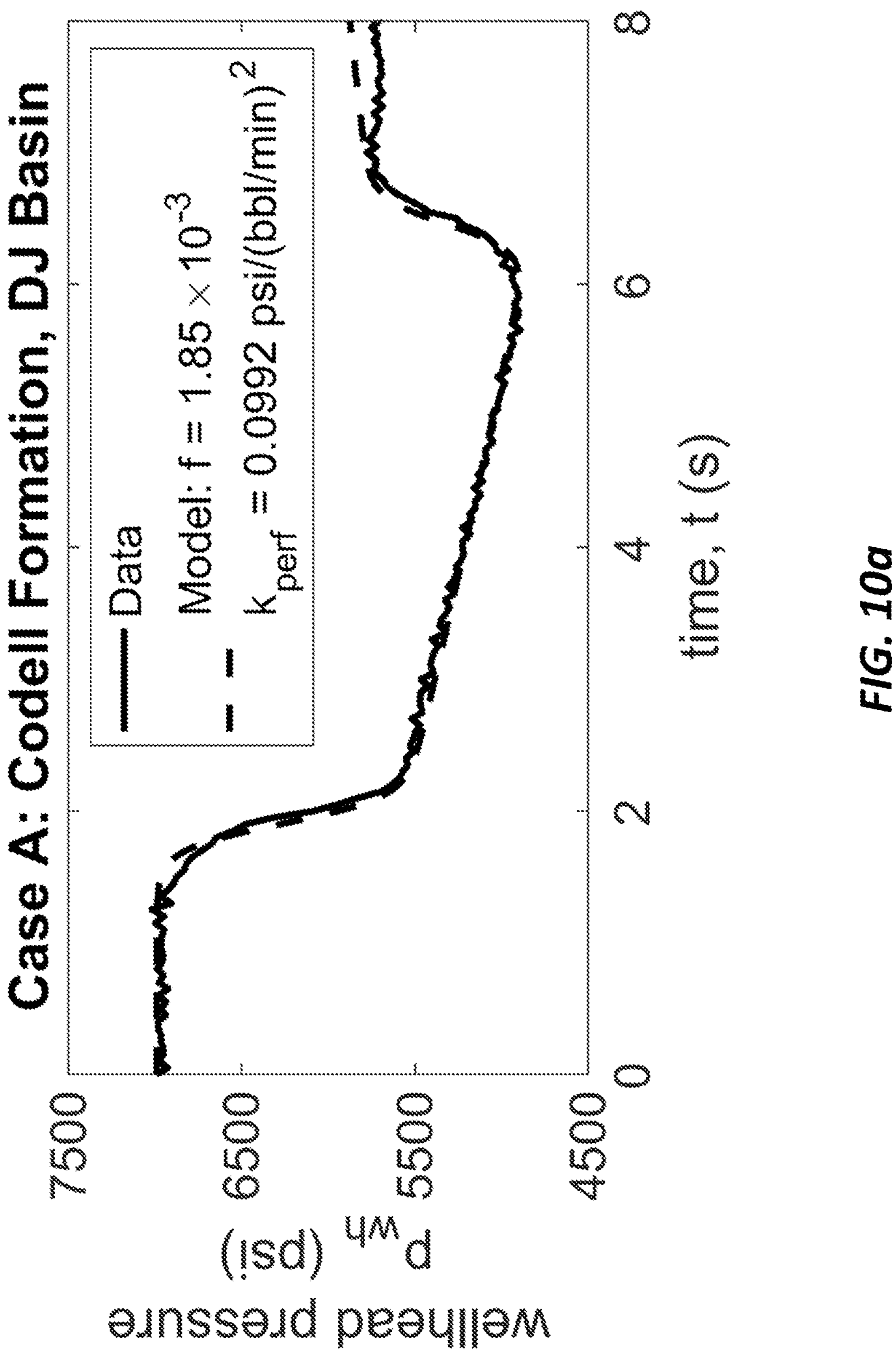
FIGS. 10*a* and 10*b* show graphs of results of a method according to the present disclosure to actual pressure data, in the Wolfcamp formation and in the Bone Spring formation.
Figure 10B:
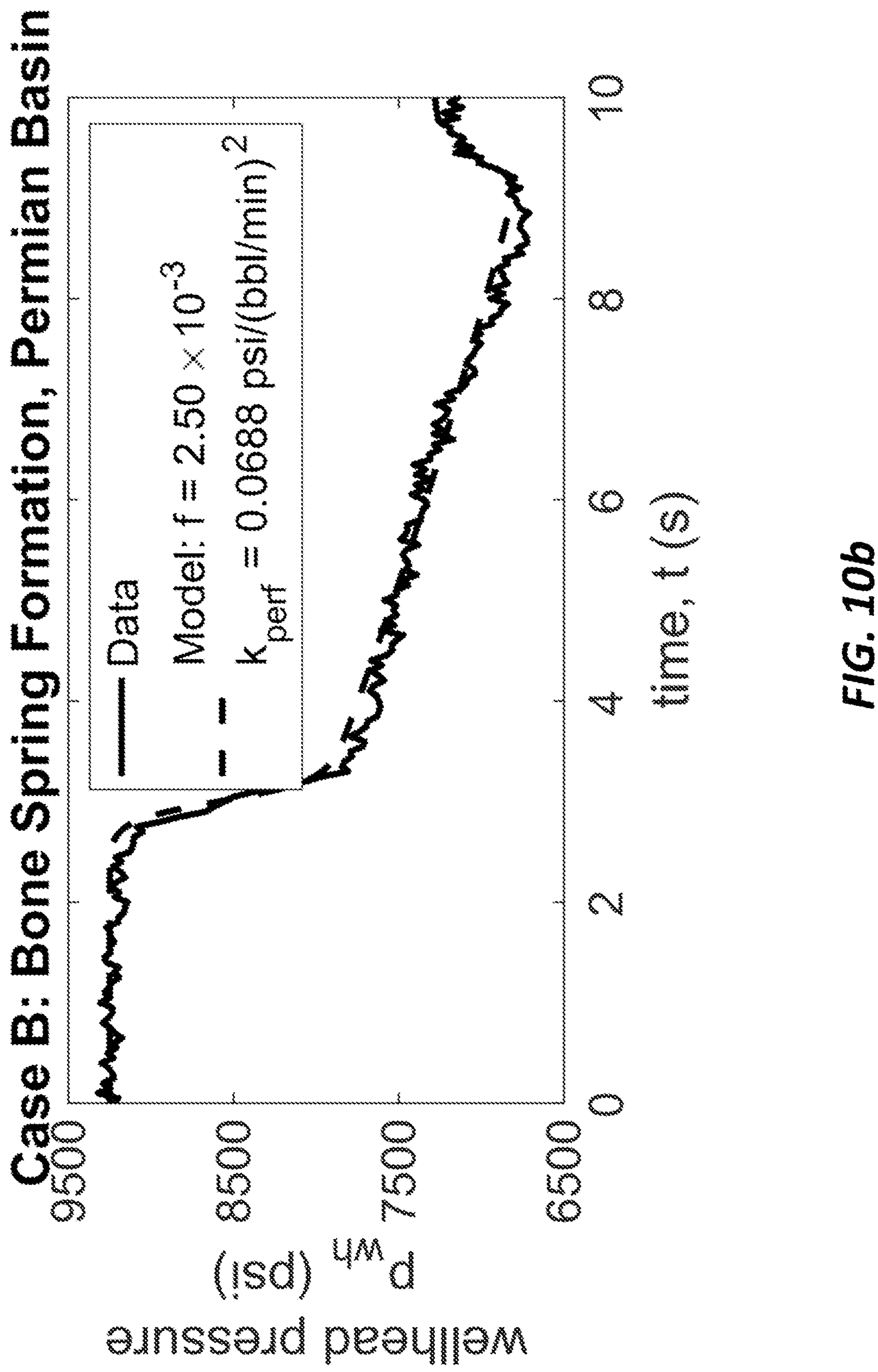

The method described above was applied to pressure data obtained from two stages in different wells, as shown in the graphs in FIG. 10. The first well, referred to as Case A and shown in the graph in FIG. 10*a*, is in the Codell Formation, D J Basin, Wyoming, and the second well, referred to as Case B and shown in the graph in FIG. 10*b*, is in the Bone Spring Formation, Permian Basin, Texas. The graphs in FIGS. 10*a* and 10*b* show both the measured and modeled wellhead pressure, after the pipe friction factor f and perforation friction coefficient $k_{perf}$ were determined using the method above (at shut-in at the end of the stage pumping). The values of f and $k_{perf}$ for each well are shown in the legend in FIGS. 10*a* and 10*b*. The values of f (approximately $2\times10^{-3}$) are an order of magnitude smaller than expected for high Reynolds number turbulent flow of water in a smooth-walled pipe (see, Moody, 1944; Chen, 1979), with the reduced value of f attributable to the use of friction reducers in the fluid being pumped through the well (see, Economides et al., 2001; Zoback & Kohli, 2019).

The determined values of $k_{perf}$ can be compared to the predicted values using the formula given earlier. To predict $k_{perf}$, the previously stated equation (Eq. 7 and Eq. 8) was used with the following parameter values: discharge coefficient C=0.9, fluid density $\rho$=62.4 lb/ft$^3$, perforation hole diameter d=0.4 in (Case A) and 0.42 in (Case B), number of perforations per cluster $N_p$=4 (Case A) and 9 (Case B), and number of clusters per stage $N_c$=8 (Case A) and 4 (Case B). The resulting predictions are $k_{perf}$=0.0931 psi/(bbl/min)$^2$ for Case A and $k_{perf}$=0.0605 psi/(bbl/min)$^2$ for Case B. The determined values are $k_{perf}$=0.0992 psi/(bbl/min)$^2$ and $k_{perf}$=0.0688 psi/(bbl/min)$^2$, respectively. The higher determined values indicate that not all perforation clusters are active. The difference between the determined and predicted values of $k_{perf}$ can be reported as a perforation cluster efficiency $\epsilon_{perf}$, defined here as the ratio of the number of active perforations and calculated from the determined $k_{perf}$ assuming the perforation hole diameter d is equal to the designed value (also known as the entry hole diameter) divided by designed number of perforations; combining the expressions stated previously yields $$\epsilon_{perf} = \frac{(N_c N_p)_{determined}}{(N_c N_p)_{predicted}} = \sqrt{\frac{k_{perf,predicted}}{k_{perf,determined}}}. \quad (21)$$

The inferred perforation cluster efficiencies are $\epsilon_{perf}$=97% (Case A) and 94% (Case B).

The perforation cluster efficiency calculated in this manner will be an upper bound on efficiency, in general, because of the possibility of perforation erosion and as it is measured at the very end of a pumping of a stage. Perforation erosion during injection increases the perforation hole diameter d above the design value (see, Ugueto et al., 2016; Lorwongngam et al., 2020), which will reduce $k_{perf}$. Because $k_{perf} \propto d^{-4}$, if the actual perforation hole diameter is $d_{actual}$ and the design value is d, then $$\epsilon_{perf} = \frac{(N_c N_p)_{determined}}{(N_c N_p)_{predicted}} = \left(\frac{d}{d_{actual}}\right)^2 \sqrt{\frac{k_{perf,predicted}}{k_{perf,determined}}} \quad (22)$$

Thus, assuming $d=d_{actual}$ to calculate efficiency $\epsilon_{perf}$ in a situation where $d<d_{actual}$ will produce a value of $\epsilon_{perf}$ that is larger than the actual efficiency. Erosion may also change the discharge coefficient C, due to changes in the geometry of the perforation edge or lip (see, Crump & Conway, 1988). Because these changes generally increase C, the same logic explained above with regard to perforation diameter again shows that the perforation cluster efficiency estimated with this method will be an upper bound.

Increasing Reliability of the Method.

Pipe and perforation friction coefficients provided by the disclosed method can be improved, or at least validated, by ensuring consistency with other constraints. The wellhead pressure decreases from the treating pressure during injection and hydraulic fracture growth to a much lower value after the well is shut-in, as shown in FIG. 2. This drop in pressure is a consequence of the reduction of frictional pressure losses as the flow rate in the well and out through the perforations is reduced. The total pressure drop from pipe and perforation friction when the injection rate is dropped from Q to zero can be calculated using the values of pipe friction coefficient f and perforation friction coefficient $k_{perf}$ by the expression:

$$p_{pipe} + p_{perf} = \left(\frac{8 f \rho}{\pi^2 D^5} L + k_{perf}\right) Q^2. \quad (23)$$

The pressure drop calculated in this manner must be less that the measured total pressure drop following shut-in. If the calculated pressure drop exceeds the measured pressure drop, this indicates an error or inaccuracy in the determination of pipe and/or perforation friction. This consistency check can be extended to a step rate test, in which injection rate is systematically decreased or increased, the water hammer oscillations are allowed to decay, and the steady state wellhead pressure at the current injection rate is measured. Consider one rate change step, from injection rate $Q_1$ to a lower value $Q_2$. The predicted pressure drop from pipe and perforation friction can be calculated using the values of f and $k_{perf}$ determined earlier, as:

$$\Delta(p_{pipe} + p_{perf}) = \left(\frac{8 f \rho}{\pi^2 D^5} L + k_{perf}\right)(Q_1^2 - Q_2^2). \quad (24)$$

The measured pressure drop, defined as the steady state wellhead pressure at rate $Q_1$ minus the steady state wellhead pressure at $Q_2$, cannot be smaller than the predicted value; otherwise, there is an error or inaccuracy in the determination of pipe and/or perforation friction.

An additional constraint is imposed by the expectation that the Darcy-Weisbach friction factor generally does not vary during fracturing operations, so that total pressure drop along the pipe throughout hydraulic fracturing operations is expected to decrease as stages are hydraulically further up the well. If fluid properties are changed, for example by varying the amounts and properties of viscosifiers (or friction reducers), these changes may also be taken into account to constrain the results of this method. By using this knowledge, multiple stages' data can be jointly inverted together.

The disclosed method requires that wells be shut in using a series of abrupt flow rate decreases or steps, separated by sufficient time to allow water hammer propagation with limited interference between the water hammers generated at previous and subsequent steps. This restriction can be relaxed if accurate flow rate measurements are made at the wellhead. Only one step of the required shut down procedure, or the measurement of flow rate, is required.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

REFERENCES CITED IN THIS DISCLOSURE

Chen, N. H. (1979). *An explicit equation for friction factor in pipe*. Industrial & Engineering Chemistry Fundamentals, 18(3), 296-297.

Cramer, D. D. (1987). *The application of limited-entry techniques in massive hydraulic fracturing treatments*. Presented at the SPE Production Operations Symposium, Oklahoma City, Oklahoma, 8-10 March. SPE-16189-MS.

Crump, J. B., & Conway, M. W. (1988). *Effects of perforation-entry friction on bottomhole treating analysis*. Journal of Petroleum Technology, 40(08), 1041-1048.

Dunham, E. M., Harris, J. M., Zhang, J., Quan, Y., & Mace, K. (2017). *Hydraulic fracture conductivity inferred from tube wave reflections*. SEG International Exposition and Annual Meeting. SEG-2017-17664595.

Economides, M., Oligney, R., & Valkó, P. (2002). *Unified fracture design: Bridging the gap between theory and practice*. Orsa Press.

Lorwongngam, A., Wright, S., Hari, S., Butler, E., McKimmy, M., Wolters, J., & Cipolla, C. (2020). *Using Multidisciplinary Data Gathering to Evaluate eXtreme Limited Entry Completion Design and Improve Perforation Cluster Efficiency*. In Unconventional Resources Technology Conference, 20-22 Jul. 2020 (pp. 341-369). Unconventional Resources Technology Conference (URTEC).

Mondal, S., Zhang, M., Huckabee, P., Ugueto, G., Jones, R., Vitthal, S., Nasse, D., & Sharma, M. (2021). *Advancements in step down tests to guide perforation cluster design and limited entry pressure intensities-Learnings from field tests in multiple basins*. SPE Hydraulic Fracturing Technology Conference and Exhibition. SPE-204147-MS.

Moody, L. F. (1944). *Friction factors for pipe flow*. Trans. ASME, 66,671-684.

Paillet, F. L., & White, J. E. (1982). *Acoustic modes of propagation in the borehole and their relationship to rock properties*. Geophysics, 47(8), 1215-1228.

Ugueto C, G. A., Huckabee, P. T., Molenaar, M. M., Wyker, B., & Somanchi, K. (2016). *Perforation cluster efficiency of cemented plug and perf limited entry completions; Insights from fiber optics diagnostics*. SPE Hydraulic Fracturing Technology Conference. SPE-179124-MS.

Weijers, L., Wright, C. A., Sugiyama, H., Sato, K., & Zhigang, L. (2000). *Simultaneous propagation of multiple hydraulic fractures-Evidence, impact and modeling implications*. International Oil and Gas Conference and Exhibition in China.

Wylie, E. B., Streeter, V. L., & Suo, L. (1993). *Fluid transients in systems*. Englewood Cliffs, NJ: Prentice Hall.

Zoback, M. D., & Kohli, A. H. (2019). *Unconventional reservoir geomechanics*. Cambridge University Press.

What is claimed is:

1. A method for determining flowing fluid pressure loss in a pipe, comprising:

moving fluid through the pipe at a first rate;

measuring a pressure of the fluid moving at the first rate;

changing the rate of moving fluid to a second rate, the rate changed so as to induce tube waves in the pipe;

measuring pressure of the fluid flowing at the second rate; and using the measured pressure flowing at the first rate and at the second rate to determine frictional fluid pressure loss in the pipe, wherein the determining fluid pressure loss in the pipe comprises determining a pipe friction factor based on pressure change with respect to time after the changing flow rate and prior to a reflected tube wave reaching a position of the measuring pressure.

2. The method of claim 1 wherein the changing rate comprises decreasing the flow rate.

3. The method of claim 1 wherein the determining pipe friction factor comprises initializing a value of the friction factor, modeling the pressure change with respect to time based on the pipe friction factor, comparing the modeled pressure change to the measured pressure change, and adjusting the pipe friction factor and repeating the modeling until a difference between the modeled pressure change and the measured pressure change falls below a selected threshold.

4. The method of claim 1, further comprising using the measured pressure flowing at the first rate and at the second rate to determine frictional fluid pressure loss in fluid flowing through perforations in the pipe; and using the measured pressures and the determined frictional fluid pressure losses to determine a fluid pressure outside the perforations.

5. The method of claim 4 wherein the determining frictional fluid pressure loss in the perforations comprises determining a friction coefficient of the perforations.

6. The method of claim 5 wherein the determining the friction coefficient of the perforations comprises initializing a value of the friction coefficient of the perforations, modeling a pressure with respect to time of a reflected tube wave in the pipe, comparing the measured pressure to the modeled reflected tube wave pressure, adjusting the friction coefficient of the perforations and repeating modeling the reflected tube wave pressure until a difference between the modeled tube wave pressure and a change in measured pressure from the reflected tube wave falls below a selected threshold.

7. The method of claim 4 wherein the fluid pressure outside of the perforations comprises fluid pressure at a mouth of a fracture in a reservoir formation.

8. The method of claim 1 wherein the flowing fluid at the first rate and at the second rate comprises pumping a hydraulic fracture treatment.

9. The method of claim 1 wherein the pipe comprises a well pipe.

10. A non-transitory computer readable medium having stored thereon a computer program, the computer program having logic operable to cause a programmable computer to perform acts, comprising:

accepting as input to the computer measurements of a pressure in a pipe of fluid moving at a first rate through the pipe;

after changing the rate of moving fluid to a second rate, the rate changed so as to induce tube waves in the pipe, accepting as input to the computer measurements of pressure of the fluid flowing at the second rate;

in the computer, using the measured pressures at the first rate and at the second rate, determining frictional fluid pressure loss in the pipe, wherein the determining fluid pressure loss in the pipe comprises determining a pipe friction factor based on pressure change with respect to time after the changing flow rate and prior to a reflected tube wave reaching a position of the measuring pressure.

11. The non-transitory computer readable medium of claim 10, wherein the changing rate comprises decreasing the flow rate.

12. The non-transitory computer readable medium of claim 10, wherein the determining pipe friction factor comprises initializing a value of the friction factor, modeling the pressure change with respect to time based on the pipe friction factor, comparing the modeled pressure change to the measured pressure change, and adjusting the pipe friction factor and repeating the modeling until a difference between the modeled pressure change and the measured pressure change falls below a selected threshold.

13. The non-transitory computer readable medium of claim 10 wherein the flowing fluid at the first rate and at the second rate comprises pumping a hydraulic fracture treatment.

14. The non-transitory computer-readable medium of claim 10 further comprising logic operable to cause a programmable computer to perform using the measured pressure flowing at the first rate and at the second rate to determine frictional fluid pressure loss in fluid flowing through perforations in the pipe; and using the measured pressures and the determined frictional fluid pressure losses to determine a fluid pressure outside the perforations.

15. The non-transitory computer readable medium of claim 14, wherein the determining frictional fluid pressure loss in the perforations comprises determining a friction coefficient of the perforations.

16. The non-transitory computer readable medium of claim 15, wherein the determining the friction coefficient of the perforations comprises initializing a value of the friction factor of the perforations, modeling a pressure with respect to time of a reflected tube wave in the pipe, comparing the measured pressure to the modeled reflected tube wave pressure, adjusting the friction coefficient of the perforations and repeating modeling the reflected tube wave pressure until a difference between the modeled tube wave pressure and a change in measured pressure from the reflected tube wave falls below a selected threshold.

17. The non-transitory computer readable medium of claim 14 wherein the fluid pressure outside of the perforations comprises fluid pressure at a mouth of a fracture in a reservoir formation.

18. The non-transitory computer readable medium of claim 10 wherein the pipe comprises a well pipe.

* * * * *